April 9, 1968  H. STEPPUTTIS  3,376,761
PLANETARY GEAR TRANSMISSION
Filed May 21, 1965  3 Sheets-Sheet 3

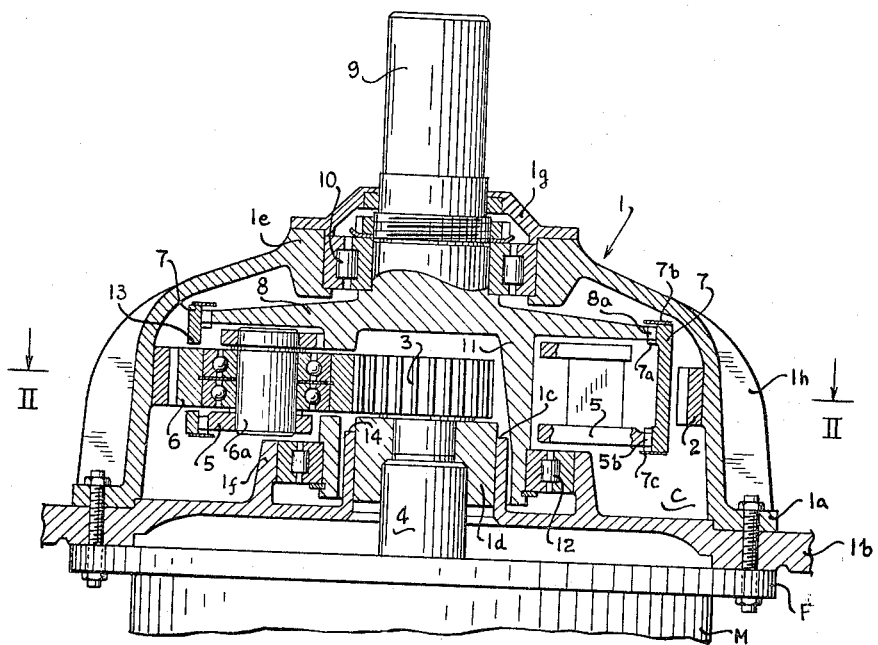

INVENTOR
HARALD STEPPUTTIS
BY Michael J. Striker
ATTORNEY

United States Patent Office 3,376,761
Patented Apr. 9, 1968

3,376,761
PLANETARY GEAR TRANSMISSION
Harald Stepputtis, Mulheim (Ruhr), Germany, assignor to Rheinstahl Huettenwerke AG, Essen, Germany
Filed May 21, 1965, Ser. No. 457,626
Claims priority, application Germany, July 18, 1964, R 38,413
19 Claims. (Cl. 74—801)

ABSTRACT OF THE DISCLOSURE

A planetary gear transmission wherein the housing accommodates the ends of coaxial driving and driven shafts and carries a ring gear meshing with planet pinions mounted in a planet carrier which is coupled to one of the shafts. The housing further accommodates two antifriction bearings provided at the opposite axial ends of the carrier. The other shaft is journalled in one of the bearings and has an extension which projects through passages provided between the carrier and one of the gears and is journalled in the other bearing.

---

The present invention relates to transmissions in general, and more particularly to planetary gear transmissions. Still more particularly, the invention relates to improvements in planetary gear transmissions wherein the driving member and/or the driven member is subjected to substantial bending stresses. Such transmissions may be used to transmit motion between a motor and a working machine, as step-down or step-up transmissions in machine tools or automotive vehicles, and for many other purposes.

In conventional transmissions in which the driving shaft or the driven shaft is subjected to substantial bending stresses, the transmission housing must be long enough to accommodate a series of strong antifriction bearings for the shaft which must resist such stresses. Thus, the transmission is rather bulky, heavy and quite expensive.

Accordingly, it is an important object of the present invention to provide a planetary gear transmission of the type wherein the driving member or the driven member is connected with the sun gear and wherein the other member is connected with the planet carrier, and to construct and assemble the transmission in such a way that, even if the member which is connected with the planet carrier undergoes substantial bending or flexing stresses, it can be properly journalled in a comparatively short and very compact housing of lightweight and relatively inexpensive construction.

Another object of the invention is to provide a planetary gear transmission wherein the driving member or the driven member may be journalled in bearings located at the opposite axial ends of the planet pinions.

A further object of the invention is to provide a planetary gear transmission of the above outlined characteristics wherein the planet carrier is connected with one of the shafts in a novel way and wherein the planet carrier is configurated in such a manner that it allows for dual journalling of its shaft.

A concomitant object of the instant invention is to provide a planetary gear transmission wherein the improved dual journalling of that shaft which is attached to the planet carrier cannot impede the operation of the transmission and wherein such dual journalling adds little to the overall weight of the entire structure.

Briefly stated, one feature of my invention resides in the provision of a planetary gear transmission which comprises a housing defining a chamber, coaxial driving and driven shafts having end portions extending into the chamber from the opposite ends of the housing, a sun gear fixed to the end portion of one of the shafts, a ring gear fixedly mounted in the chamber and spacedly surrounding the sun gear, at least one but preferably two or more equidistant planet pinions meshing with the two gears, a planet carrier coupled or otherwise secured to the end portion of the other shaft, first and second sets of passages respectively defined by the planet pinions with the ring gear and sun gear whereby the first set of passages surrounds the planet carrier and the carrier surrounds the second set of passages, first and second antifriction bearings mounted in the housing at the opposite axial ends of the planet pinions so that the end portion of the other shaft is journalled in one of the bearings, and an extension rigid with the end portion of the other shaft and journalled in the other bearing. This extension comprises sections which extend through one set of passages, i.e., the extension may be surrounded by or it may surround the planet carrier.

In accordance with another feature of my invention, the connection between the planet carrier and the respective end portion comprises a coupling including a substantially sleeve-like coupling element which comprises sections extending through one set of passages. The sections of the coupling element may extend through the same passages as the sections of the extension, or each such group of sections may extend through a separate set of passages. It is also possible to construct the sections in such a way that the diameter of the coupling element equals the diameter of the extension; in such transmissions, the two groups of sections extend through the same set of passages.

The novel features which are considered as characteristic of the invention are set forth in particular in the appended claims. The improved transmission itself, however, both as to its construction and the mode of assembling the same, together with additional features and advantages thereof, will be best understood upon perusal of the following detailed description of certain specific embodiments with reference to the accompanying drawings, in which:

FIG. 1 is an axial section through a planetary gear transmission which is constructed and assembled in accordance with a first embodiment of my invention;

FIG. 2 is a fragmentary transverse section substantially as seen in the direction of arrows from the line II—II of FIG. 1;

Figure 3:
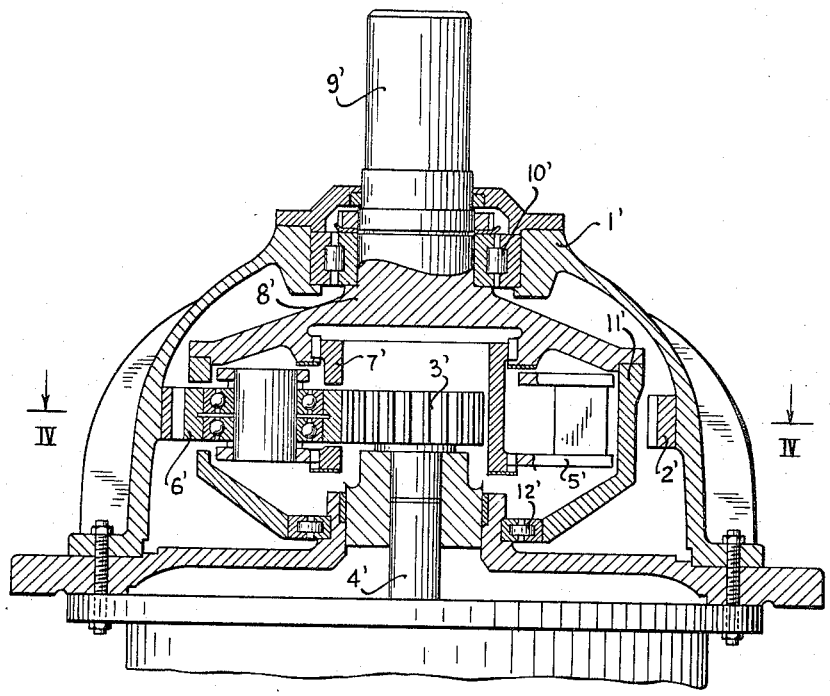
FIG. 3 is an axial section through a second transmission.

Referring first to FIGS. 1 and 2, there is shown a planetary gear transmission which comprises a cupped housing 1 defining a chamber C and fixedly supporting an annular ring gear 2. The sun gear 3 of the transmission is mounted on a drive shaft 4 which is rotated by an electric motor M or another suitable prime mover. As shown in FIG. 1, the casing of the motor M comprises a flange F which is bolted to a flange 1a of the housing 1. This housing further comprises a lid 1b which defines a collar 1c for a sleeve-like bearing 1d surrounding a portion of the drive shaft 4. The bottom wall 1e of the housing 1 accommodates a simple antifriction bearing 10, e.g., a roller bearing, for a driven shaft 9 which is coaxial with the drive shaft 4. The end portion of the driven shaft 9 is journalled in the bearing 10 and comprises a disk-shaped support 8 which is integral with a basket-like or sleeve-like extension 11 surrounding the sun gear 3 and the collar 1c. This extension 11 is rotatable in a simple antifriction bearing 12, e.g., a roller bearing, which is mounted in a second collar 1f of the lid 1b. The aperture in the bottom wall 1e is sealed by an annular cap 1g which surrounds the end portion of the driven shaft 9. The outer side of the housing 1 is stiffened by ribs 1h, and the end portion of the driving shaft 4 extends through a central aperture in the lid 1b.

The transmission further comprises a planet carrier 5 for a set of equidistant planet pinions 6 rotatable on planet shafts 6a which are journalled in the carrier 5. This carrier is coupled with the driven shaft 9 by a coupling including internal teeth 7a provided on a sleeve-like or basket-like coupling element 7 which surrounds the carrier 5, external teeth 5b provided on the periphery of the carrier, and external teeth 8a provided on the periphery of the support 8. The pinions 6 mesh with the ring gear 2 and with the sun gear 3. When the sun gear 3 rotates in response to rotation of the driving shaft 4, the pinions 6 drive the planet carrier 5 which in turn drives the support 8 of the output shaft 9 through the intermediary of the coupling element 7. The cylindrical wall of the coupling element 7 is formed with cutouts 13 for the planet pinions 6, there being three such pinions in the transmission of FIGS. 1 and 2. The extension 11 is provided with cutouts 14 which accommodate portions of the planet pinions 6, see FIG. 2. The coupling element 7 carries rings 7b, 7c which hold it against excessive axial movement with reference to the support 8 and planet carrier 5.

The coupling element 7 comprises three arcuate sections which extend through passages defined by the ring gear 2 with the planet pinions 6 outside of the carrier 5, and the extension 11 also comprises three arcuate sections which extend through passages defined by the planet pinions with the sun gear 3 inside of the carrier 5. Thus, the planet carrier separates the passages for the sections of the coupling element 7 from the passages for the sections of the extension 11.

A very important advantage of the improved transmission is that its housing is exceptionally short despite the fact that one of its shafts is journalled in two axially spaced bearings. Furthermore, and since the shaft which is coupled to the planet carrier can be journalled at two axially spaced points, the bearings which support this shaft may be of simple, inexpensive and light-weight design. It was found that the shaft 9 is capable of taking up and withstanding exceptionally large bending stresses, and this is attributed to the fact that the two bearings 10, 12 are located at the opposite axial ends of the planet pinions 6. The bearings 10 and 12 are preferably mounted at a maximum permissible distance from each other; however, the dimensions of the housing 1 normally need not be increased for the sole purpose of mounting the bearings 10, 12 at a considerable distance from each other. In other words, and if the compactness of the transmission is the primary aim of the designer, the bearings 10, 12 will be mounted at the opposite axial ends of a relatively short housing.

Figure 4:
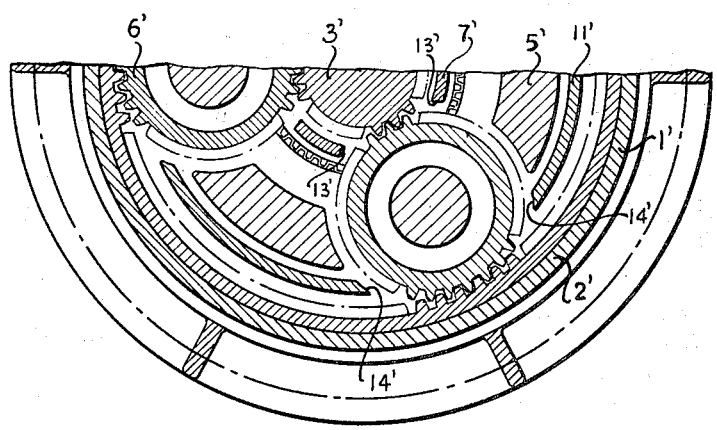
FIG. 4 is a fragmentary transverse section substantially as seen in the direction of arrows from the line IV—IV of FIG. 3.

The numerals utilized to identify the parts of a modified planetary gear transmission which is shown in FIGS. 3 and 4 are identical with the numerals used in FIGS. 1 and 2, but each thereof is followed by a prime. It will be seen that the arcuate sections of the coupling element 7' are surrounded by the planet carrier 5' and that the planet carrier is surrounded by the arcuate sections of the extension 11' of the driven shaft 9'. However, in this embodiment of my invention the extension 11' is welded, riveted, bolted or otherwise attached to the support 8' of the driven shaft. The coupling element 7' is formed with cutouts 13' for the inner portions of the planet pinions 6', and the extension 11' is formed with cutouts 14' to accommodate the outer portions of the planet pinions.

Figure 5:
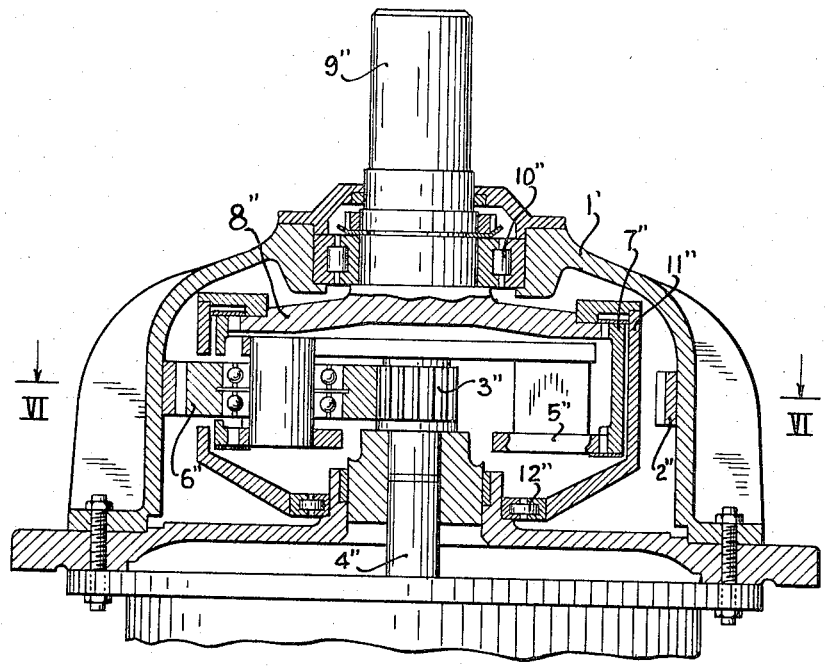
FIG. 5 is an axial section through a third transmission.
Figure 6:
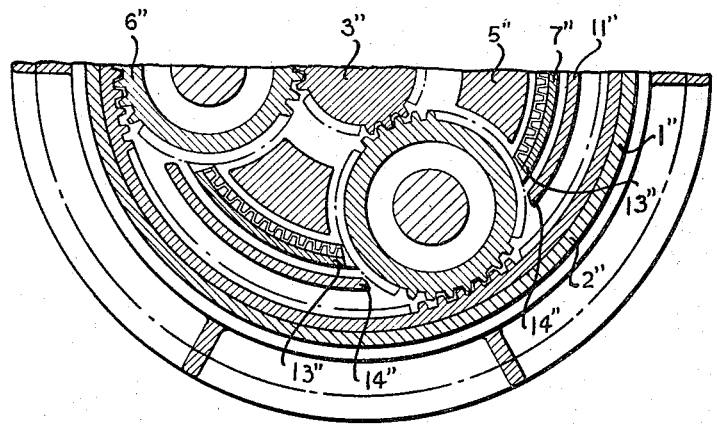
FIG. 6 is a fragmentary transverse section substantially as seen in the direction of arrows from the line VI—VI of FIG. 5.

In FIGS. 5 and 6, the component parts of a third planetary gear transmission are identified by the same numerals as those used in FIGS. 1 and 2, but each such numeral is followed by two primes. In this embodiment of my invention, the sections of the coupling element 7″ extend through the same set of passages as the sections of the extension 11″ of the driven shaft 9″. In other words, the parts 7″, 11″ surround the planet carrier 5″. These parts are respectively formed with cutouts 13″, 14″ to accommodate the adjoining portions of the planet pinions 6″.

It is evident that the sections of the coupling element 7″ and extension 11″ could pass through the passages between the planet pinions 6″ and the sun gear 3″, i.e., the planet carrier 5″ could surround the coupling element and the extension. This modification is so obvious that it can be readily comprehended without necessitating a separate illustration. All that counts is to provide one of the shafts (i.e., the driving shaft or the driven shaft) with an extension whose sections project through passages defined by the planet pinions with the sun gear or with the ring gear, and that this same driven or driving shaft be coupled to the planet carrier by an element whose sections extend through one set of such passages, be it the passages which also accommodate the sections of the extension or the other set of passages. In each of the three illustrated embodiments of my invention, the diameter of the extension is different from the diameter of the coupling element, even if these parts are mounted in a manner as shown in FIGS. 5 and 6. However, it is equally within the purview of my invention to use an extension whose diameter is exactly the same as that of the coupling element. In such modified transmission, the extension must be provided with additional cutouts to accommodate the coupling element, and vice versa.

It is also clear that the coupling element 7″ of FIGS. 5 and 6 may surround the extension 11″. The construction which is shown in FIGS. 1 to 4 (i.e., wherein the coupling element comprises sections which extend through one set of passages and the extension of the shaft 9 or 9' comprises an extension whose sections project through the other set of passages) is normally preferred because the transmission is more compact. This will be readily understood by referring to FIGS. 5 and 6 wherein the passages defined by the pinions 6″ with the sun gear 3″ within the planet carrier 5″ remain empty.

A copending patent application Ser. No. 254,666 of Friedrich Jarchow (filed on Jan. 29, 1963 and assigned to the same assignee), now Patent No. 3,218,889, discloses a planetary gear transmission wherein the pressure between the teeth of the two gears and the planet pinions is equalized by providing a floating bearing for one of the gears and the planet carrier. The planet carrier is connected with the respective shaft by a universal joint which allows for limited universal movements of the carrier. The coupling element 7, 7' or 7″ of my transmission constitutes a further development of such universal joint. This coupling element can be accommodated in passages which are present in my improved transmission so that the provision of this element adds little, if anything, to the overall weight and/or dimensions of the transmission.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. A planetary gear transmission, comprising a housing defining a chamber; coaxial driving and driven members having portions extending into said chamber from the opposite ends of said housing; a sun gear fixed to one of said portions; a ring gear fixedly mounted in said housing and spacedly surrounding said sun gear; at least one planet pinion meshing with said gears; a carrier for said pinion; first and second bearing means provided in said housing at the opposite axial ends of said pinion, said portion of one of said members being journalled in one of said bearing means; and an extension rigid with said one member and having sections extending between said pinion and one of said gears, said extension being journalled in the other of said bearing means and being distinct from said planet carrier.

2. A planetary gear transmission, comprising a housing defining a chamber; coaxial driving and driven shafts having portions extending into said chamber from the opposite ends of said housing; a sun gear fixed to one of said portions; a ring gear fixedly mounted in said housing and spacedly surrounding said sun gear; at least one planet pinion meshing with said gears; a planet carrier secured to the other of said portions, said pinion and said gears defining between themselves first and second passage means respectively surrounding and surrounded by said carrier; first and second bearing means supported by said housing at the opposite axial ends of said pinion, said other portion being journalled in one of said bearings and comprising an extension extending through one of said passage means and journalled in the other of said bearing means, said extension being distinct from said planet carrier.

3. A planetary gear transmission, comprising a housing defining a chamber; coaxial driving and driven shafts having portions extending into said chamber from the opposite ends of said housing; a sun gear fixed to one of said portions; a ring gear fixedly mounted in said housing and spacedly surrounding said sun gear; at least one planet pinion meshing with said gears; a planet carrier secured to the other of said portions, said pinion and said gears defining between themselves first and second passage means respectively surrounding and surrounded by said carrier; first and second bearing means supported by said housing at the opposite axial ends of said pinion, said other portion being journalled in one of said bearings and comprising an extension extending through said first passage means and journalled in the other of said bearing means, said extension being distinct from said planet carrier.

4. A planetary gear transmission, comprising a housing defining a chamber; coxial driving and driven shafts having portions extending into said chamber from the opposite ends of said housing; a sun gear fixed to one of said portions; a ring gear fixedly mounted in said housing and spacedly surrounding said sun gear; at least one planet pinion meshing with said gears; a planet carrier secured to the other of said portions, said pinion and said gears defining between themselves first and second passage means respectively surrounding and surrounded by said carrier; first and second bearing means supported by said housing at the opposite axial ends of said pinion, said other portion being journalled in one of said bearings and comprising an extension extending through said second passage means and journalled in the other of said bearing means, said extension being distinct from said planet carrier.

5. A planetary gear transmission, comprising a housing defining a chamber; coaxial driving and driven shafts having end portions extending into said chamber from the opposite ends of said housing; a sun gear fixed to the end portion of said driving shaft; a ring gear fixedly mounted in said housing and spacedly surrounding said sun gear; at least one planet pinion meshing with said gears; a planet carrier secured to the end portion of said driven shaft, said pinion and said gears defining between themselves first and second passage means respectively surrounding and surrounded by said carrier; first and second bearing means supported by said housing at the opposite axial ends of said pinion, the end portion of said driven shaft being journalled in one of said bearings and comprising an extension extending through one of said passage means and journalled in the other of said bearing means, said extension being distinct from said planet carrier.

6. A planetary gear transmission, comprising a housing defining a chamber; coaxial driving and driven shafts having portions extending into said chamber from the opposite ends of said housing; a sun gear fixed to one of said portions; a ring gear fixedly mounted in said housing and spacedly surrounding said sun gear; a plurality of equidistant planet pinions meshing with said gears; a planet carrier secured to the other of said portions, said pinions and said gears defining between themselves a first and a second set of passages respectively surrounding and surrounded by said carrier; first and second bearing means supported by said housing at the opposite axial ends of said pinions, said other portion being journalled in one of said bearings and comprising an extension extending through one set of said passages and journalled in the other of said bearing means, said extension being distinct from said planet carrier.

7. A planetary gear transmission, comprising a housing defining a chamber; coaxial driving and driven shafts having portions extending into said chamber from the opposite ends of said housing; a sun gear fixed to one of said portions; a ring gear fixedly mounted in said housing and spacedly surrounding said sun gear; planet pinions meshing with said gears; a planet carrier coupled to the other of said portions, said pinions and said gears defining between themselves a first and a second set of passages respectively surrounding and surrounded by said carrier; first and second bearing means supported by said housing at the opposite axial ends of said pinions, said other portion having a sleeve-like extension including sections extending through one set of said passages and said extension being journalled in the other of said bearings and being distinct from said planet carrier.

8. A planetary gear transmission as set forth in claim 7, wherein said extension is provided with cutouts for said planet pinions.

9. A planetary gear transmission, comprising a housing defining a chamber; coaxial driving and driven shafts having end portions extending into said housing from the opposite ends of said housing; a sun gear fixed to one of said end portions in said chamber; a ring gear fixedly mounted in said chamber and spacedly surrounding said sun gear; planet pinions angularly spaced from each other and meshing with said gears; a carrier for said pinions, said gears and said pinions defining between themselves a first and a second set of passages respectively surrounding and surrounded by said carrier; first and second bearing means mounted in said housing at the opposite axial ends of said pinions, the other of said end portions being journalled in one of said bearings and comprising an extension having sections extending through one set of said passages, said extension being journalled in the other of said bearings; and coupling means connecting said carrier to said other end portion, said coupling means comprising a coupling element having sections extending through one set of said passages.

10. A planetary gear transmission, comprising a housing defining a chamber; coaxial driving and driven shafts having end portions extending into said housing from the opposite ends of said housing; a sun gear fixed to one of said end portions in said chamber; a ring gear fixedly mounted in said chamber and spacedly surrounding said sun gear; planet pinions angularly spaced from each other and meshing with said gears; a carrier for said pinions, said gears and said pinions defining between themselves a first and a second set of passages respectively surrounding and surrounded by said carrier; first and second bearing means mounted in said housing at the opposite axial ends of said pinions, the other of said end portions being journalled in one of said bearings and comprising an extension having sections extending through one set of said passages, said extension being journalled in the other of said bearings; and coupling means connecting said carrier to said other end portion, said coupling means comprising a coupling element having sections extending through the other set of said passages.

11. A planetary gear transmission, comprising a housing defining a chamber; coaxial driving and driven shafts having end portions extending into said housing from the opposite ends of said housing; a sun gear fixed to one of said end portions in said chamber; a ring gear fixedly mouted in said chamber and spacedly surrounding said sun gear; planet pinions angularly spaced from each other and meshing with said gears; a carrier for said pinions, said gears and said pinions defining between themselves a first and a second set of passages respectively surrounding and surrounded by said carrier; first and second bearing means mounted in said housing at the opposite axial ends of said pinions, the other of said end portions being journalled in one of said bearings and comprising an extension having sections extending through one set of said passages, said extension being journalled in the other of said bearings; and coupling means connecting said carrier to said other end portion, said coupling means comprising a coupling element having sections extending through said one set of said passages.

12. A planetary gear transmission, comprising a housing defining a chamber; coaxial driving and driven shafts having end portions extending into said housing from the opposite ends of said housing; a sun gear fixed to one of said end portions in said chamber; a ring gear fixedly mounted in said chamber and spacedly surrounding said sun gear; planet pinions angularly spaced from each other and meshing with said gears; a carrier for said pinions, said gears and said pinions defining between themselves a first and a second set of passages respectively surrounding and surrounded by said carrier; first and second bearing means mounted in said housing at the opposite axial ends of said pinions, the other of said end portions being journalled in one of said bearings and comprising an extension having sections extending through said first set of said passages, said extension being journalled in the other of said bearings; and coupling means connecting carrier to said other end portion, said coupling means comprising a coupling element having sections extending through said second set of said passages.

13. A planetary gear transmission, comprising a housing defining a chamber; coaxial driving and driven shafts having end portions extending into said housing from the opposite ends of said housing; a sun gear fixed to one of said end portions in said chamber; a ring gear fixedly mounted in said chamber and spacedly surrounding said sun gear; planet pinions angularly spaced from each other and meshing with said gears; a carrier for said pinions, said gears and said pinions defining between themselves a first and a second set of passages respectively surrounding and surrounded by said carrier; first and second bearing means mounted in said housing at the opposite axial ends of said pinions, the other of said end portions being journalled in one of said bearings and comprising an extension having sections extending through said second set of said passages, said extension being journalled in the other of said bearings; and coupling means connecting said carrier to said other end portion, said coupling means comprising a coupling element having sections extending through said first set of said passages.

14. A planetary gear transmission, comprising a housing defining a chamber; coaxial driving and driven shafts having end portions extending into said housing from the opposite ends of said housing; a sun gear fixed to one of said end portions in said chamber; a ring gear fixedly mounted in said chamber and spacedly surrounding said sun gear; planet pinions angularly spaced from each other and meshing with said gears; a carrier for said pinions, said gears and said pinions defining between themselves a first and a second set of passages respectively surrounding and surrounded by said carrier; first and second bearing means mounted in said housing at the opposite axial ends of said pinions, the other of said end portions being journalled in one of said bearings and comprising an extension having sections extending through said first set of said passages, said extension being journalled in the other of said bearings; and coupling means connecting said carrier to said other end portion, said coupling means comprising a coupling element having sections extending through said first set of said passages.

15. A planetary gear transmission, comprising a housing defining a chamber; coaxial driving and driven shafts having end portions extending into said housing from the opposite ends of said housing; a sun gear fixed to one of said end portions in said chamber; a ring gear fixedly mounted in said chamber and spacedly surrounding said sun gear; planet pinions angularly spaced from each other and meshing with said gears; a carrier for said pinions, said gears and said pinions defining between themselves a first and a second set of passages respectively surrounding and surrounded by said carrier; first and second bearing means mounted in said housing at the opposite axial ends of said pinions, the other of said end portions being journalled in one of said bearings and comprising an extension having sections extending through said second set of said passages, said extension being journalled in the other of said bearings; and coupling means connecting said carrier to said other end portion, said coupling means comprising a coupling element having sections extending through said second set of said passages.

16. A planetary gear transmission, comprising a housing defining a chamber; coaxial driving and driven shafts having end portions extending into said housing from the opposite ends of said housing; a sun gear fixed to one of said end portions in said chamber; a ring gear fixedly mounted in said chamber and spacedly surrounding said sun gear; planet pinions angularly spaced from each other and meshing with said gears; a carrier for said pinions, said gears and said pinions defining between themselves a first and a second set of passages respectively surrounding and surrounded by said carrier; first and second bearing means mounted in said housing at the opposite axial ends of said pinions, the other of said end portions being journalled in one of said bearings and comprising an extension having sections extending through one set of said passages, said extension being journalled in the other of said bearings; and coupling means connecting said carrier to said other end portion, said coupling means comprising a sleeve-like toothed coupling element having sections extending through one set of said passages, the teeth of said coupling element meshing with teeth provided on said carrier and said other end portion.

17. A planetary gear transmission as set forth in claim 16, wherein said coupling element is provided with cutouts for said planet pinions.

18. In a planetary gear transmission, coaxial driving and driven shafts; a sun gear mounted on one of said shafts; a fixed ring gear spacedly surrounding said sun gear; a plurality of angularly spaced pinions meshing with said gears; a carrier supportingly connected with said pinions; coupling means coupling said carrier to the other of said shafts, said pinions and said gears defining between themselves a first and a second set of passages respectively surrounding and surrounded by said carrier; a pair of coaxial antifriction bearings mounted at the opposite axial ends of said pinions, said other shaft being journalled in one of said bearings and having an extension projecting through one set of said passages and journalled in the other of said bearings, said extension being distinct from said carrier.

19. A structure as set forth in claim 18, wherein said coupling means comprises a sleeve-like coupling element having sections extending through one set of said passages, said coupling element being non-rotatably coupled to said other shaft and said carrier.

References Cited

UNITED STATES PATENTS

| | | | |
|---|---|---|---|
| 1,820,061 | 8/1931 | Flagg | 74—801 |
| 1,945,361 | 1/1934 | Ball | 74—801 |
| 2,320,379 | 6/1943 | Niekamp | 74—421.5 |
| 2,522,443 | 9/1950 | Gaubatz et al. | 74—801 |
| 2,591,743 | 4/1952 | Thompson | 74—801 |
| 2,596,794 | 5/1952 | Schmitter | 74—421.5 |
| 3,080,775 | 3/1963 | Fritsch | 74—801 |
| 3,257,869 | 6/1966 | Sharples | 74—801 |
| 3,293,948 | 12/1966 | Jarchow | 74—801 |

FOREIGN PATENTS 266,948  8/1929  Italy.

FRED C. MATTERN, Jr., *Primary Examiner.*

THOMAS C. PERRY, *Examiner.*